US010444084B2

(12) United States Patent
Yilmazoglu et al.

(10) Patent No.: US 10,444,084 B2
(45) Date of Patent: Oct. 15, 2019

(54) SPRING SENSOR ELEMENT HAVING CARBON NANOTUBES

(71) Applicant: Technische Universitaet Darmstadt, Darmstadt (DE)

(72) Inventors: Oktay Yilmazoglu, Gross-Zimmern (DE); Sandeep Yadav, Darmstadt (DE); Deniz Cicek, Darmstadt (DE); Joerg Schneider, Seeheim-Jugenheim (DE)

(73) Assignee: TECHNISCHE UNIVERSITAET DARMSTADT, Darmstadt (DE)

( * ) Notice: Subject to any disclaimer, the term of this patent is extended or adjusted under 35 U.S.C. 154(b) by 230 days.

(21) Appl. No.: 14/969,057

(22) Filed: Dec. 15, 2015

(65) Prior Publication Data

US 2016/0178459 A1 Jun. 23, 2016

(30) Foreign Application Priority Data

Dec. 17, 2014 (DE) .......................... 10 2014 018 878

(51) Int. Cl.
| | |
|---|---|
| *G01L 1/04* | (2006.01) |
| *G01P 15/09* | (2006.01) |
| *G01L 1/18* | (2006.01) |
| *G01L 1/22* | (2006.01) |
| *G01P 15/08* | (2006.01) |
| *B82Y 15/00* | (2011.01) |

(52) U.S. Cl.
CPC .................. *G01L 1/04* (2013.01); *G01L 1/18* (2013.01); *G01L 1/2293* (2013.01); *G01P 15/09* (2013.01); *B82Y 15/00* (2013.01); *G01P 2015/0851* (2013.01); *Y10S 977/742* (2013.01)

(58) Field of Classification Search
CPC . G01L 1/04; G01L 1/18; G01L 1/2293; G01P 15/09; G01P 2015/0851; B82Y 15/00; Y10S 977/742
USPC ................................................... 73/774, 777
See application file for complete search history.

(56) References Cited

U.S. PATENT DOCUMENTS

| | | | |
|---|---|---|---|
| 6,286,226 B1 | 9/2001 | Jin | |
| 6,996,147 B2 * | 2/2006 | Majumdar | ............ B82Y 10/00 257/E21.12 |

(Continued)

FOREIGN PATENT DOCUMENTS

| | | |
|---|---|---|
| DE | 10 2010 036586 | 1/2012 |
| DE | 10 2011 051705 | 1/2013 |

OTHER PUBLICATIONS

J. Lee et al., "Vertical Carbon . . . Resonant Sensing", Transducers 2013, Barcelona, Spain, 2013, S. 1887-1890.

*Primary Examiner* — Octavia Hollington
(74) *Attorney, Agent, or Firm* — Clark & Brody

(57) ABSTRACT

The subject of the invention is a spring sensor element 1, comprising carbon nanotubes 6 on a carrier 2, wherein the carbon nanotubes 6 are arranged in CNT blocks 10, 20, 30, 40, wherein the carbon nanotubes 6 of each CNT block 10, 20, 30, 40 preferably have the same length and the same alignment with respect to the carrier 2, wherein at least the highest one of the CNT blocks 10, 20, 30, 40 is arranged nearby at least two electric contacts 60, 61, 62. The spring sensor element 1 has at least one additional neighboring CNT block 20, 30, 40 of the height H2 in addition to the first CNT block 10 of the height H1, wherein the heights H1 and H2 differ by a factor of at least 2.

26 Claims, 6 Drawing Sheets

(56) References Cited

U.S. PATENT DOCUMENTS

| | | | | |
|---|---|---|---|---|
| 7,091,120 B2* | 8/2006 | Buretea | ................. | B82Y 10/00 |
| | | | | 438/197 |
| 7,777,478 B2* | 8/2010 | Dai | ................. | G01D 5/142 |
| | | | | 324/109 |
| 8,347,726 B2* | 1/2013 | Kobayashi | ............ | B82Y 15/00 |
| | | | | 257/E23.165 |
| 8,568,027 B2* | 10/2013 | Ivanov | ................. | B82Y 30/00 |
| | | | | 374/185 |
| 8,680,574 B2* | 3/2014 | Hart | ................. | B32B 3/22 |
| | | | | 257/184 |
| 8,848,183 B2* | 9/2014 | Yi | ................. | G01N 21/658 |
| | | | | 356/301 |
| 9,082,930 B1* | 7/2015 | Wacker | ................. | H01L 35/32 |
| 10,001,422 B2* | 6/2018 | Jang | ................. | G01L 1/16 |
| 2007/0155025 A1* | 7/2007 | Zhang | ................. | B82Y 10/00 |
| | | | | 438/3 |
| 2008/0129278 A1 | 6/2008 | Dai et al. | | |
| 2012/0126449 A1 | 5/2012 | Hart et al. | | |

* cited by examiner a)

b)

a)

b)

a)

b)

c)

SPRING SENSOR ELEMENT HAVING CARBON NANOTUBES

The present invention relates to a novel spring sensor element for measuring forces and/or accelerations. It relates in particular to a spring sensor element having carbon nanotubes (also known as CNTs).

PRIOR ART

Spring sensor elements usually include a spring element with a sensor element coupled to it mechanically. The spring element is designed as a separate bending bar or membrane, for example, and is normally located on the sensor element. The sensor element is an electrically conductive component.

The basic operation of spring sensor elements is that a movement of the spring element leads to a deformation of the spring sensor element. Therefore, there are variations in the electric conductivity and/or the electric resistance of this sensor element. The deformation of the sensor element and thus the deformation of the spring sensor element as a whole can be determined by measuring this resistance.

Spring sensor elements are used in a wide range of technical measurement applications. These include use as a force sensor or as an acceleration sensor, among other things, or use for indirect detection of the application of a force to a body to which the spring sensor element is applied. In the latter case, the deformation of the body causes deformation of the spring element, so that the deformation of the body can be determined indirectly by means of the change in resistance of the sensor element.

A particularly accurate determination of the deformation of a sensor element is achieved when the deformation acts as distinctly as possible on its electric resistance. Then there is a high measurement sensitivity. The measurement sensitivity is described by the so-called K factor, which indicates the proportionality between a relative change in resistance and the strain to be measured and should be high as possible in most cases. For example, it is known from U.S. Pat. No. 6,286,226 B1 that carbon nanotubes can be used as the sensor element of a spring sensor element. These carbon nanotubes are typically arranged in blocks on the carrier. These arrangements are also referred to as CNT blocks. With these sensors based on CNT blocks, which were already known in the past, pressure is applied to the top of the blocks or they are deflected laterally from above and their subsequent change in resistance is measured vertically or laterally. All the blocks are the same in length, which limits the maximum deflection. Contacting and use are difficult due to the requirement of equal length.

In each of these CNT blocks, the carbon nanotubes usually have a uniform alignment. A strain/compression (vertically) or deflection (laterally) of the sensor element in a direction transverse to the alignment of the carbon nanotubes will result in a change in the electric conductivity of the arrangement of carbon nanotubes that can be measured by means of the sensor element, this change being in the direction transverse to the alignment of the carbon nanotubes. Meanwhile, individual carbon nanotubes are each subjected to mechanical deformation to thereby detect any change in the electric conductivity as well as piezoresistive effects, which are also based on compressive/tensile stress.

Sensor elements having carbon nanotubes allow more accurate measurements because, due to the use of carbon nanotubes, they usually have a comparatively high K factor in comparison with sensor elements made of metal. Furthermore, individual carbon nanotubes have a high elastic modulus, a high tensile strength and a high thermal stability. CNT blocks with a lower specific density (e.g., 0.06-0.12 $g/cm^3$) have a low elastic modulus and low stiffness. Existing sensors (such as those described in DE 102010036586 A1, for example) use vertical CNT blocks with carbon nanotubes of the same length. A compressive effect on the upper ends here yields only a minor change in resistance, so they are still not sensitive enough for many applications. Furthermore, this arrangement requires strictly vertical CNT blocks, which makes it difficult to produce them. The compressive effect from above can even lead to permanent contact with neighboring blocks of the same height. This is a disadvantage for reproducible measurements.

The document DE 102011051705 A1 proposes an upper carbon nanotube contact to overcome these disadvantages, but this is much more complicated to manufacture because another element must be implemented.

OBJECT

Against this background, the object of the present invention is to make available an improved spring sensor element that is simple to manufacture, permits a measurement with a particularly high precision and does not have the aforementioned disadvantages of the prior art. In addition, the object of the invention is to provide a simple spring sensor element that can also detect particularly small forces and accelerations.

ACHIEVING THE OBJECT

This object is achieved by a spring sensor element having the features of claim 1. Advantageous embodiments and refinements of the present invention are derived from the dependent claims.

The spring sensor element 1 according to the invention comprises carbon nanotubes 6 on a carrier 2. The carbon nanotubes 6 are arranged in CNT blocks 10, 20, 30, 40. Each of the carbon nanotubes 6 of each CNT block 10, 20, 30, 40 preferably has the same length and the same alignment with respect to the carrier 2. In addition, at least the highest one of the CNT blocks 10, 20, 30, 40 is arranged in proximity to at least two electric contacts 60, 61, 62.

The spring sensor element 1 comprises, in addition to a first CNT block 10 of the height H1, at least one additional neighboring CNT block 20, 30, 40 with the height H2, wherein the heights H1 and H2 differ from one another by a factor of at least 2, preferably 4, especially preferably 8.

The different lengths permit a greater sensitivity of the spring sensor element 1 because the CNT blocks act not only as sensor elements but also as spring elements. Therefore, no separate spring element, for example, a bending bar, is needed.

The alignment of the carbon nanotubes 6 is not necessarily perpendicular to the surface of the carrier 2. This permits a great range of deflection, as illustrated in FIG. 1a.

A uniform alignment of the carbon nanotubes 6 of each CNT block 10, 20, 30, 40 causes a horizontal deformation of the spring sensor element 1 to result in a clearly measurable change in the electric resistance of the CNT block 10, 20, 30, 40 in the direction horizontal but also perpendicular to the surface of the carrier 2.

The height H of a CNT block 10, 20, 30, 40 results from the length L of the carbon nanotubes 6 and their alignment angle $\alpha$ (see FIG. 1b), where $H = L \cdot \sin(\alpha)$. The alignment angle $\alpha$ describes the angle between the surface of the carrier substrate 2 to the carbon nanotubes 6 of a CNT block 10, 20, 30, 40. The alignment angle α is always greater than 0° because measurement of the second vertical force component is otherwise impossible. If the carbon nanotubes 6 of a CNT block 10, 20, 30, 40 are perpendicular to the carrier substrate 2, then the alignment angle α=90° and the length of the carbon nanotubes 6 corresponds to the height of a CNT block 10, 20, 30, 40.

The longer CNT block 10 is subsequently referred to as the main block for reasons of better comprehensibility because movement of this block makes the greatest contribution to the measured change in resistance. The shorter CNT block(s) 20, 30, 40 is (are) referred to as the secondary block(s) accordingly.

For certain configurations up to 50, the factor of the difference in height between the main block 10 and the secondary block(s) 20, 30, 40 may even be as high as 100 in individual cases. The difference in heights of H1 and H2 between the main block and the secondary block(s) is definitive for the sensitivity of the spring sensor element 1 for forces that not only have a vertical component 100 but also have at least one or exclusively one horizontal component 200, 300. In addition, the difference in height means that the carbon nanotubes 6 of neighboring CNT blocks 10, 20, 30, 40 do not adhere to one another under the influence of force, so that the spring sensor element 1 functions reliably with frequent loading and also with greater deformation of the longer CNT block. The alignment is preferably reversible. This is not necessary in the case of sensor elements for sensors that should function only once, for example, emergency systems such as airbags.

"Neighboring" here means that the distance from components of the spring sensor element 1 of two CNT blocks 10, 20, 30, 40 or one CNT block and one electric contact is less than the length of the carbon nanotubes 6 of the longer one of the two CNT blocks 10, 20, 30, 40. In the limiting case, the distance may also be 0; in other words, two CNT blocks 10, 20, 30, 40 and/or one CNT block 10, 20, 30, 40 and one electric contact 60, 61, 62 are directly adjacent to one another. It is also possible here for an electric contact 60, 61, 62 to be situated beneath a CNT block 10, 20, 30, 40. This is the case with CNT block 20 and contact 60, for example, in FIG. 1a.

The change in resistance depends on the length of the carbon nanotubes and increases with an increase in the length of the carbon nanotube. Since the main block 10 is the longest, it undergoes the greatest deformation and/or is deflected to the greatest extent. The electric conductivity here changes the most. However, in contrast with the known approaches, the main component of the change in resistance results in new lateral connections between the CNTs in the main block 10 and those in a secondary block 20, 30, 40.

The carbon nanotubes 6 of a CNT block 10, 20, 30, 40 of the spring sensor element 1 preferably have a uniform alignment. This means that the direction in which the carbon nanotubes 6 extend is the same for all carbon nanotubes of the arrangement aside from tolerances due to the manufacturing technology. This means that the alignment angle α is also essentially the same for all carbon nanotubes 6.

An acting force and/or an acceleration (for example, due to an acting pressure, tactile contact, vibration or flow of gases and liquids) can cause deformation of the individual carbon nanotubes 6. The measurement principle is then based on detecting the resulting change in electric conductivity as well as piezoresistive effects. The conductivity can be determined by measuring the resistance between at least two electric contacts 60, 61, 62.

When a force acts on the spring sensor element 1, the first effect is modification of the resistance of the CNT blocks 10, 20, 30, 40. Deflection of the CNT blocks under a compressive load increases the current in the vicinity of the contacts of the carbon nanotubes having the carrier 2. This is proportional to the deformation exerted and has an approximately linear relationship. This enables the measurement of pressures, deflections and accelerations with a high spatial resolution. This makes use of the transverse conductivity of the individual carbon nanotubes. The compressive stress causes a mechanical deformation of the CNT blocks and a change in resistance.

In the absence of an applied force, the electric resistance between the contacts 60 and 61 is high because there are no lateral transverse connections between the main block 10 and the secondary block(s) 20, 30, 40 over which the current can flow (see FIG. 2).

A second effect that causes a great change in resistance occurs when the force is so great that the deformed carbon nanotubes of the main block 10 come in contact with neighboring carbon nanotubes of the secondary blocks 20, 30, 40 or an electrically conductive intermediate block 80 that may optionally also be present. Lateral transverse connections occur in this case. These lateral transverse connections are additional current paths between the main block 10 and the neighboring secondary block(s) 20, 30, 40, so therefore there is a marked drop in resistance. The change in the lateral resistance is particularly great when the lateral transverse connections between the CNT blocks 10, 20, 30, 40 occur close to the carrier substrate 2. Due to the low stiffness of the main block 10 in particular, it can be deflected enough to obtain a sensor response without any additional mass. Due to the low mass of the carbon nanotubes, a spring sensor element with a small inherent mass is possible without additional bending bars.

Each CNT block 10, 20, 30, 40 has a density of 10 billion to 100 billion carbon nanotubes per $mm^2$. The carbon nanotube diameter is from 2 to 6 nm, preferably 3 nm to 5 nm, and the carbon nanotube length is 100 to 1500 μm. The carbon nanotubes here are preferably positioned vertically on a carrier substrate. They are designed with one or more walls. This sensor principle has been tested experimentally with these specified values but they are only one exemplary embodiment. However, the spring sensor element 1 also functions for other CNT densities, CNT diameters and CNT lengths.

Measurement of the electric resistance of a CNT block 10, 20, 30, 40 provides information about the electric properties of the individual carbon nanotubes present in it. The large number of carbon nanotubes leads to a reliable mean value. Therefore, the production of sensors having similar properties from the spring sensor element 1 according to the invention is greatly facilitated in particular. The very densely arranged carbon nanotubes 6 have an intensified interaction with their neighboring carbon nanotubes. The electromechanical properties depend to a great extent on the mechanical load on the carbon nanotube arrangements. The CNT geometry (length, width, depth and elastic modulus) define the maximum deflection at a given force. Thus, for example, decreases in the lateral resistance of up to 10% at 50 μm deflection of the CNT main block 10 have been measured.

The electric contacts 60, 61, 62 to the arrangement of carbon nanotubes 6 may be used for wiring a plurality of spring sensor elements 1 to form a measurement bridge circuit, for example. Additionally or alternatively, the capacitance can also be measured.

The carrier 2 may be constructed of any suitable material in principle, such as, for example, Si, $SiO_2$, $Al_2O_3$, indium tin oxide (ITO), SiC, TiN, MgO, $CaCO_3$, mica, Mo, W, Cu, Au, Pt, INCONEL, quartz, graphene, zeolites, $MoS_2$, $MoSe_2$, WS, $WSe_2$, boron nitride, phosphorenes or stainless steel.

The bending properties (such as the elastic modulus and the bending elasticity) can be adjusted according to the desired application through the choice of the carrier 2 and optionally the substrate 3 (see fifth embodiment) as well as the intermediate layer 7 (see sixth embodiment). These substrates can also be designed as flexible layers, depending on the material.

When several CNT blocks are considered together, it is called a group of CNT blocks. CNT blocks 10, 20, 30, 40 or groups of CNT blocks of a spring sensor element 1 may be arranged in different ways relative to one another. When the CNT blocks and/or the groups of CNT blocks are arranged in a line, this is a single-row arrangement. This is illustrated in FIG. 2 as an example. When the CNT blocks and/or groups of CNT blocks are arranged in an offset arrangement, this is a multi-row arrangement, which is shown in FIG. 3 as an example.

In a second embodiment, a CNT block 10 of the height H1 is arranged between a second neighboring CNT block 20 with the height H2 and the third CNT block 30 with the height H3. These three CNT blocks 10, 20, 30 are arranged in a row. In addition, the heights H1 and H2 as well as H1 and H3 differ by a factor of at least 2, preferably 4, especially preferably 8 to 50, with the CNT block 10 being the higher one in each case. The factor may be up to 100 if a corresponding sensitivity is required. The heights H2 and H3 here are preferably the same.

In a third embodiment, the spring sensor element 1 is designed so that it is possible to measure a first horizontal force component 200 and a second horizontal force component 300. The spring sensor element 1 therefore also has at least one further CNT block 40 in addition to the first CNT block 10 and a neighboring second CNT block 20 and optionally a third CNT block 30, which is arranged in a single row with the first two CNT blocks according to the second embodiment, and the CNT blocks 10, 20, 30, 40 are arranged in multiple rows.

A force acting on the main block 10 causes new lateral connections between the CNTs in the main block 10 and in the secondary block(s) 20, 30, 40, as described above.

A fourth embodiment of the spring sensor element 1 additionally comprises at least one intermediate block 8 between the main block 10 and at least one secondary block 20, 30, 40. Therefore, the secondary block 20, 30, 40 is a defined distance away from the main block (for example, 1/20 to ½ of H1). The intermediate block 8 (with vertical or lateral alignment) (see drawing in FIG. 4) is made of an electrically conductive material. It is mainly relevant here that the intermediate block forms a lateral connection between the CNT blocks 10, 20, 30, 40 in at least some sections. It may also be designed in the form of a bridge.

Under an acting force, a particularly large number of lateral transverse connections are formed between the main block 10 and the intermediate block 8, which therefore increases the lateral change in resistance. However, spring sensor elements 1 can also be used without an intermediate block 8, depending on the application, but they are less sensitive.

In a fifth embodiment, the carrier 2 is on a substrate 3, which faces away from the CNT blocks 10, 20, 30, 40. This increases the mechanical stability of the spring sensor element 1 and serves to define its elastic properties. For attaching the spring sensor 1 to a curved or uneven body in a particularly simple manner, the substrate 3 is a flexible film made of a plastic, for example, such as polyethylene terephthalate (PET), polyvinyl chloride (PVC) or polyamide. A carrier 2 in the sense of the invention may also be understood to be a coating on a substrate 3. The substrate 3 may also be made of the same material as the carrier 2. In addition, the dimensions (length L, width B, depth T) of the CNT blocks and in particular the ratio of the heights of the CNT blocks (H1 to H2, for example) can be varied, depending on the field of application.

In a sixth embodiment, the spring sensor element 1 also has an intermediate layer 7 between the CNT blocks 10, 20, 30, 40 and facing the CNT blocks 10, 20, 30, 40. The layer thickness of this intermediate substrate 7 is preferably less than 10 nm. It is ideally only a single layer of atoms and/or molecules thick (monolayer). The intermediate layer 7 is made of an electrically conductive material, preferably having a piezoresistive effect. For example, graphene, $MoS_2$, $MoSe_2$, $WS_2$, $WSe_2$, boron nitride or phosphorenes may be used for such thin layers. However, this may also be a vapor deposited layer of metal.

This intermediate layer 7 improves the electric contact of the carbon nanotubes 6 and causes them to have a defined electric resistance, while increasing the sensitivity and the measurement accuracy of the spring sensor element 1. The deflection or deformation of CNT block 10 can cause stresses on this intermediate layer 7 and the effective lateral change in resistance may even undergo further changes.

In a seventh embodiment, the spring sensor element 1 also has at least one electrically conductive intermediate block 8 with a vertical or lateral alignment between at least two CNT blocks 10, 20, 30, 40. This increases the measurement sensitivity with forces acting horizontally (horizontal force components 200 and 300) because, depending on the extent of these forces, a more or less great number of carbon nanotubes 6 of the CNT blocks 10, 20, 30, 40 are in contact with the intermediate block 8. Any material (e.g., CNT) that is an adequate conductor of electricity can be considered as the material here. It should not have a higher electric resistance than the carbon nanotubes.

In an eighth embodiment, the spring sensor element 1 also has at least one magnet 50. These magnets 50 are located on the side of at least one CNT block 10, 20, 30, 40 facing away from the carrier 2. The magnet advantageously sits on the side of the main block 10 facing away from the carrier 2. The movement of the magnet 50 on the CNT block 10, 20, 30, 40 can preferably be evaluated by a conventional magnetic field sensor 51. By means of this additional information, minor deflections of the block can be detected and the spring sensor element 1 can exhibit a high sensitivity with good resolution. According to this embodiment, it is also fundamentally possible for the spring sensor element 1 to have an intermediate layer 7, at least one intermediate block 8 and/or a substrate 3. To position the magnet 50 in a stable position, a fastening means, for example, an adhesive is advantageously used between the magnet and the CNT block 10, 20, 30, 40.

The spring sensor element according to the invention is preferably used in a sensor for measuring at least one force component and/or an acceleration component.

On the whole, the advantages of the spring sensor element 1 according to the invention include its low elastic modulus (less than 200 kPa). This permits easy deflection and thus a high sensitivity. In addition, its advantages also include the stable deflection. Bending up to almost 90° is thus possible.

In addition, the CNT blocks 10, 20, 30, 40 do not require a precisely defined alignment. Therefore, simple lithography processes and CNT growth can be used for their production.

The area for use of the spring sensor element 1 is based on its use in sensors for measuring pressures, tactile contact, vibration or the flow of gases and/or liquids. It thus permits particularly small sensor measurements (edge length less than 100 µm) while having a high measurement resolution in the µm range.

So-called MEMS sensors (MEMS=microelectromechanical systems) are a class of sensors, in which the sensor elements according to the invention are very suitable for use. These sensors are also relevant for integrated system-on-a-chip (SoC, i.e., single chip system) applications in particular.

Method for Manufacturing the Spring Sensor Element:

First the electric contacts 60, 61, 62, made of Ni, for example, are applied to the carrier 2 (e.g., $SiO_2$ on a 300 nm silicon wafer). To do so, a photoresist mask is defined by means of a photolithographic method and the metallization (e.g., Ni) is applied by vapor deposition. After the lift-off process, electric contacts 60, 61, 62 are defined, but the carrier 2 may also be completely metallized in advance and structured by means of a photolithographic method and then etching. However, the first process with lift-off is preferred.

To obtain the desired uniform alignment of the carbon nanotubes 6 and the desired structuring of the carbon nanotubes 6, in a preferred method for producing the spring sensor element 1 according to the invention, suitably structured catalyst materials are applied to the carrier 2 and/or to a possible intermediate layer 7 in an optional prior step. These catalyst materials consist of a thin iron catalyst layer is (1.0-1.4 nm) on a thin aluminum layer (10-12 nm), which has been applied to the wafer by vapor deposition by using an electron beam.

Additional catalysts include Fe, Co, Ni, Au, Ag, Pt, Pd, Cu, Mn, Mo, Cr, Sn, Mg, Ge or $SiO_2$, for example.

As an alternative to this, the structuring of the catalysts does not take place until after the deposition, for example, by means of photolithographic processes, and then etching.

Then the carbon nanotubes 6 are applied selectively to the catalyst regions on the carrier 2 and/or to a possible intermediate layer 7. The carbon nanotubes 6, which are predominantly double-walled and vertically aligned, are synthesized by means of the chemical vapor deposition method (CVD). Before the growth of the CNT blocks, the photolithographically structured photoresist mask is removed by means of acetone. The synthesis of the carbon nanotubes, which is supported catalytically, is performed in a quartz tube oven (inside diameter 29 mm, outside diameter 31 mm and length 80 mm) at atmospheric pressure.

Growth typically takes place at 780° C. for 3-10 minutes under an atmosphere of argon (Ar), hydrogen ($H_2$), ethylene ($C_2H_4$) and water vapor. Ar flows through the system continuously during all steps of the process (heating, growth and cooling phases). The argon flow rate is 600 standard cubic centimeters per minutes (sccm) and the hydrogen flow rate is 200 sccm.

After heating, 75 sccm ethylene and water vapor (with approx. 150 to 200 ppm as a catalyst stabilizer) are introduced into the oven by blasting small amounts of carrier gas through a water container.

The secondary blocks 20, 30, 40 are formed on the extensive contacts 60, 61, 62 (made of Ni, for example) created previously. However, the main block 10 is formed between two extensive electric contacts 60, 61, 62. The CNT growth rate on the extensive contact is much lower and can be adjusted, for example, with the thickness of the metal or the structure.

By means of this method, one main block 10 is arranged between each of two secondary blocks 20, 30, 40. The blocks lie on a straight line along which a horizontal force component can be measured. The secondary blocks 20, 30 are formed on the extensive electric contacts 60, 61 (e.g., Ni) applied previously during production. However, the main block is situated between these electric contacts. The CNT growth rate on the extensive contacts is much lower and can be adjusted with the metal thickness or structure, for example.

Subsequent structuring of the carbon nanotubes 6 on the carrier 2 is also possible. For example, photolithographic methods of lift-off and/or etching may also be used.

A method of micro-nanointegration of flexible, vertically aligned single-walled or multi-walled, structured carbon nanotubes 6 in CNT blocks is used here. One CNT main block 10 is situated between each of the electric contacts 60, 61, 62 (e.g., Ni) structured before the growth of the carbon nanotubes, wherein the secondary blocks 20, 30, 40 are situated entirely or partially on electric contacts 60, 61, 62.

A simple strip mask here defines the depth T of the CNT blocks. The width B of the CNT blocks is preferably implemented by means of the spacings of the electric contacts 60, 61, 62. The height H of the CNT blocks is adjusted by adapting the growth time in the production process.

In an optional process step in the production process, passivation of the arrangement of carbon nanotubes is also performed to protect the arrangement of carbon nanotubes 6 from external interfering factors, such as mechanical stress or the influence of moisture, for example. The carbon nanotubes here are provided with a very thin, electrically nonconductive and chemically inert coating. The passivation may takes place by means of polymers deposited from a plasma or from the liquid phase, among other things.

DESCRIPTION OF THE DRAWINGS

In the following description, additional aspects and exemplary embodiments of the present invention are disclosed. Furthermore, reference is made to the accompanying drawings. This disclosure of the invention should not limit the features or main elements of the invention to a specific exemplary embodiment. Instead, those skilled in the art in this field can combine the various elements, aspects and features disclosed in the exemplary embodiments in various ways to achieve one or more advantages of the present invention.

In addition, FIG. 1 shows an additional CNT block 10 in the partial illustration in FIG. 1b. This CNT block 10 comprises a plurality of individual carbon nanotubes 6, which are aligned in the same way and therefore they all have essentially the same angle of alignment α with respect to the surface of the carrier 2. This angle is usually but not necessarily approximately 90°. In addition, the individual carbon nanotubes 6 are of the same length, so that the CNT block 10 has a uniform height H.

Figure 1:
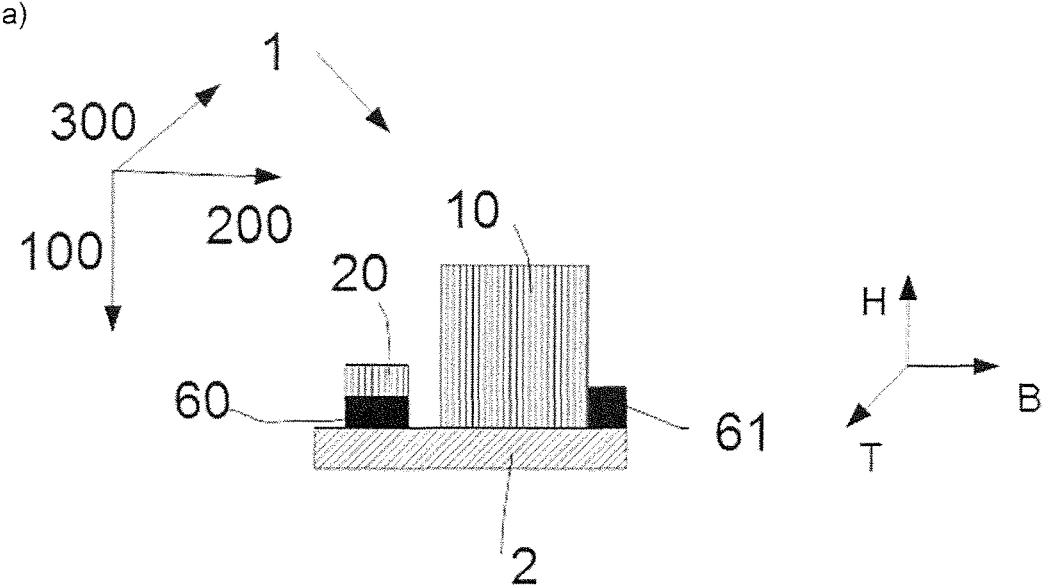
FIG. 1 shows the spring sensor element 1 according to the invention in a side view (schematically) in the partial drawing in FIG. 1a. It comprises a first CNT block 10 and a second CNT block 20, which are arranged on a carrier 2. This carrier 2 may be an Si wafer, for example. The height H of the second CNT block 20 is much smaller (by a factor of at least 2) than that of the first CNT block 10. The measured variable here is the resistance between the electric contacts 60 and 61. The measuring device is not illustrated, but the measurement of the resistance on the basis of a voltage drop along a measurement distance is a standard method. If a vertical force component 100 is acting perpendicular to the surface of the carrier 2, there is a change in resistance due to the compression of the carbon nanotubes 6. A horizontal force component 200, 300 results in an inclination of the carbon nanotubes 6, wherein the angle of alignment α of the carbon nanotubes 6 in the much longer first CNT block 10 changes to a greater extent than the angle of alignment α of the carbon nanotubes 6 in the second CNT block 20. This also causes a measurable change in resistance. Bending the main block 10 causes new lateral connections between the CNTs in the main block 10 and in the secondary block 20.
Figure 1:
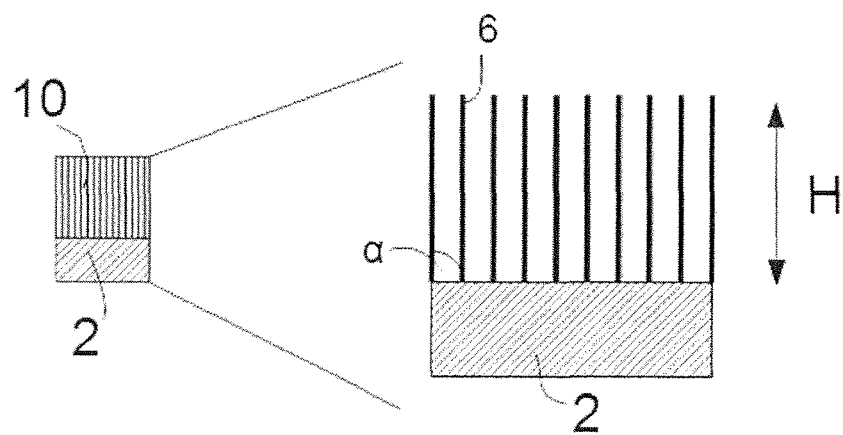
Figure 2:
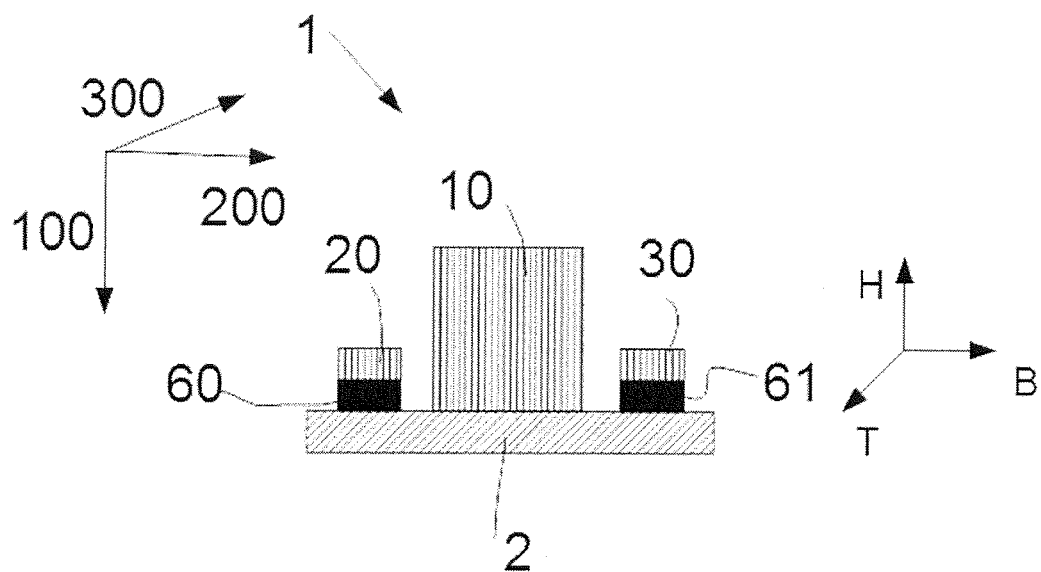
FIG. 2 shows the spring sensor element 1 with an additional (third) CNT block 30 in an embodiment variant comprised of a single row. The partial illustration in FIG. 2a shows a side view. In this embodiment, the first CNT block 10 is situated between a second CNT block 20 and a third CNT block 30. The height H1 of the CNT block 10 is much greater (by a factor of at least 2) than the height H2 of the neighboring block 20 and the height H3 of the neighboring CNT block 30. The CNT block 10 therefore experiences greater deformation with force/acceleration. If there is contact between the CNT block 10 and the CNT block 20 or the CNT block 30, there is a very great change in resistance between the electric contacts 60 and 61, thus permitting a very accurate measurement.
Figure 2:
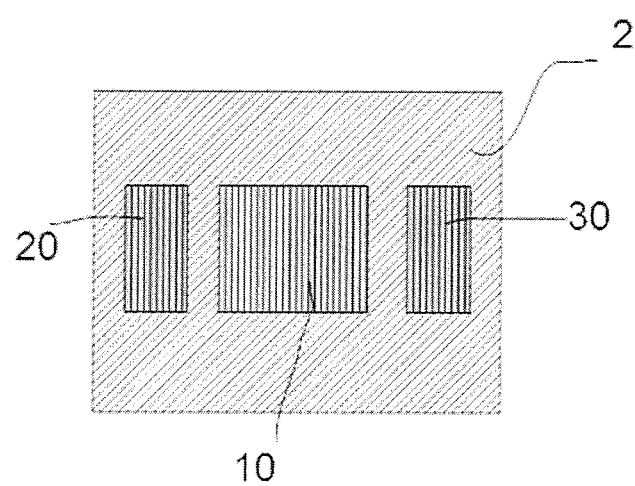

In the partial illustration in FIG. 2b, the spring sensor element 1 according to the invention is shown in a view from above, where it can be seen that the CNT blocks 10, 20, 30 are designed in one line, i.e., in a single row.

Figure 3:
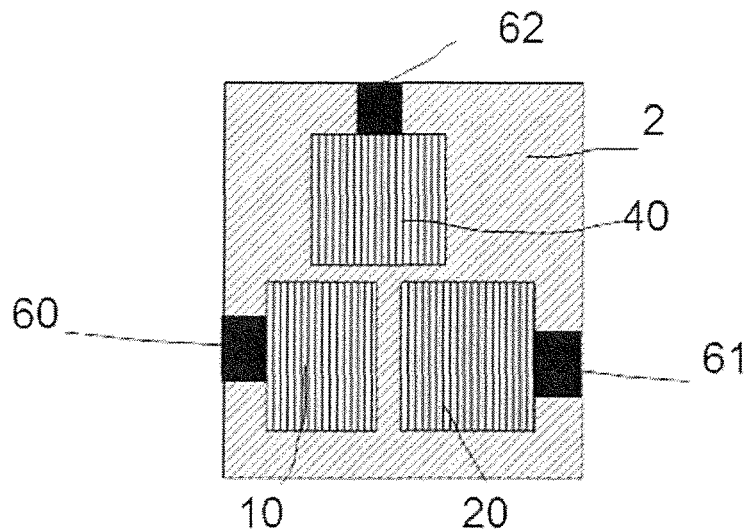

FIG. 3 shows the spring sensor element 1 with an additional third CNT block 40 in an embodiment variant having a plurality of rows, as seen from above. The spring sensor element 1 therefore additionally includes another CNT block 40 in addition to the first CNT block 10 and a neighboring second CNT block 20. The three CNT blocks are not formed in a line, i.e., they are designed to form multiple rows.

Due to the additional electric contact 62 on the CNT block 40, measurement of a second horizontal force component 300 is thus also possible in addition to measurement of a first horizontal force component 200.

Figure 4:
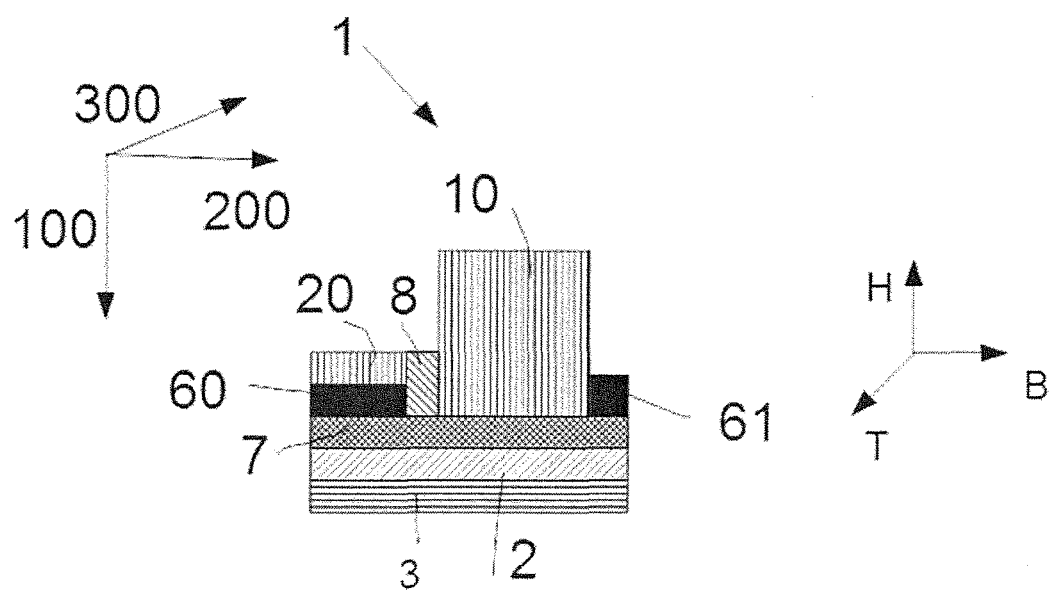

FIG. 4 shows an embodiment of the spring sensor element 1 having a plurality of optional components. These possible additional components include a substrate 3, an intermediate layer 7 and an intermediate block 8, but these are independent of one another. It is also possible to use them individually. The spring sensor element 1 shown here additionally comprises a substrate 3 on the side of the carrier 2 facing away from the CNT blocks 10, 20. The substrate 3 serves to stabilize the spring sensor element 1 and to secure its elasticity. The substrate 3 is preferably made of a flexible material, for example, a plastic such as PET, PVC or polyamide, so that the spring sensor element 1 can be deformed. However, a different material may also be used, depending on the field of application.

In addition, the spring sensor element 1 comprises a thin intermediate layer 7 on the side of the carrier 2 facing the CNT blocks 10, 20. This is usually thinner than 10 nm, preferably even thinner than 5 nm. It can also be implemented as a monolayer with a material such as graphene or $MoS_2$. When a force acts on the spring sensor element 1, distortions in the atomic grid of the material of the intermediate layer 7 occur in the intermediate layer 7. Especially if this is very thin, it results in a great change in the resistance. Therefore the sensitivity of the spring sensor element 1 is increased.

Furthermore, the spring sensor element 1 between the first CNT block 10 and the second CNT block 20 comprises an electrically conductive intermediate block 8. Its influence on the resistance depends greatly on how many of the carbon nanotubes of the adjacent CNT blocks 10, 20 come in contact with the electrically conductive intermediate block 8. In the case of a large horizontal force component 200, there are numerous contacts and there is a great change in resistance due to the inclination of the carbon nanotubes. The intermediate block 8 thus increases the sensitivity in detection of forces acting horizontally as well as vertically.

Figure 5:
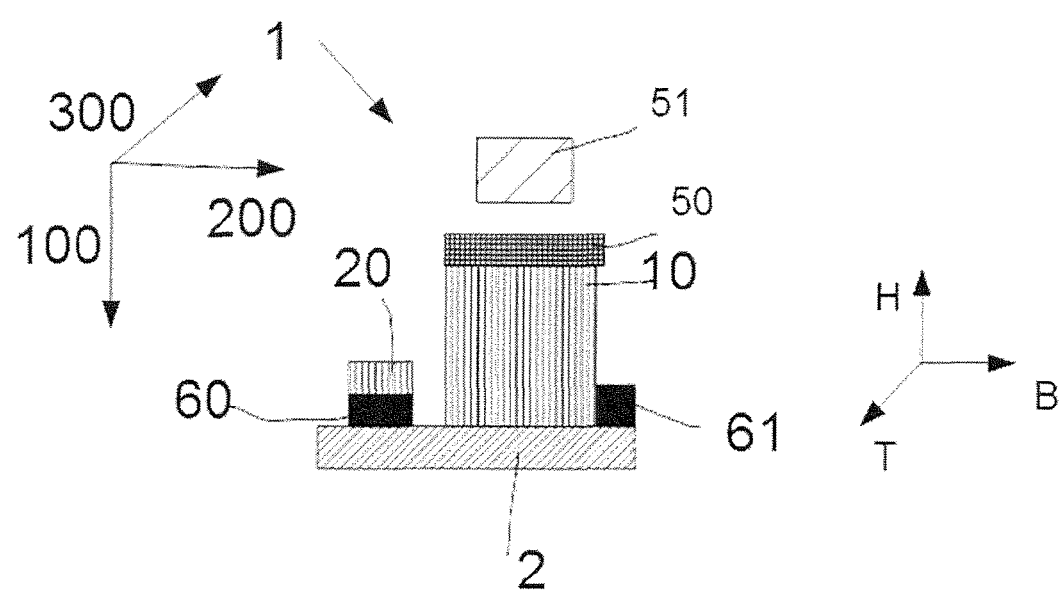

FIG. 5 shows an embodiment of the spring sensor element 1, additionally comprising a magnet 50, which is situated here on the main block 10. When a force or acceleration is in effect, the movement of this magnet 50 is evaluated by means of the magnetic field sensor 51 in addition to the information from the change in resistance.

Figure 6:
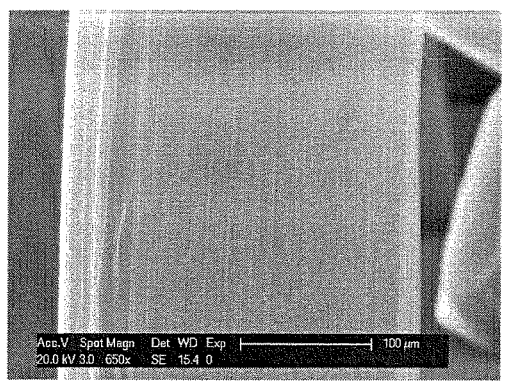
Figure 6:
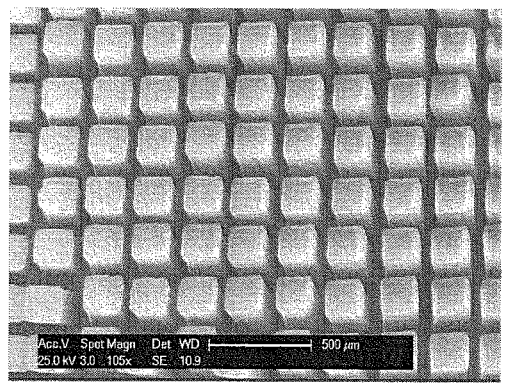
Figure 6:
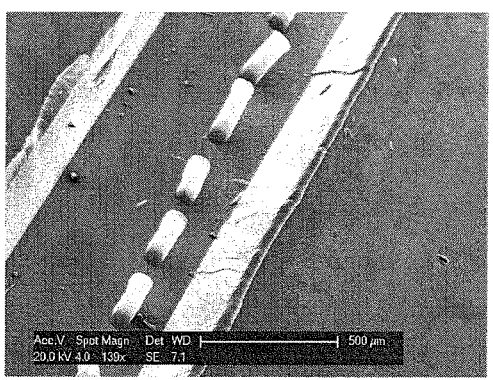

FIGS. 6a-c show various micrographs of CNT block structures. The partial diagram in FIG. 6a shows CNT blocks arranged vertically in a solid block structure arrangement. The partial diagram in FIG. 6b shows CNT blocks with an edge length of 200 μm arranged vertically, and the partial diagram in FIG. 6c shows a succession of individually arranged CNT blocks in an etched Si trench structure.

Figure 7:
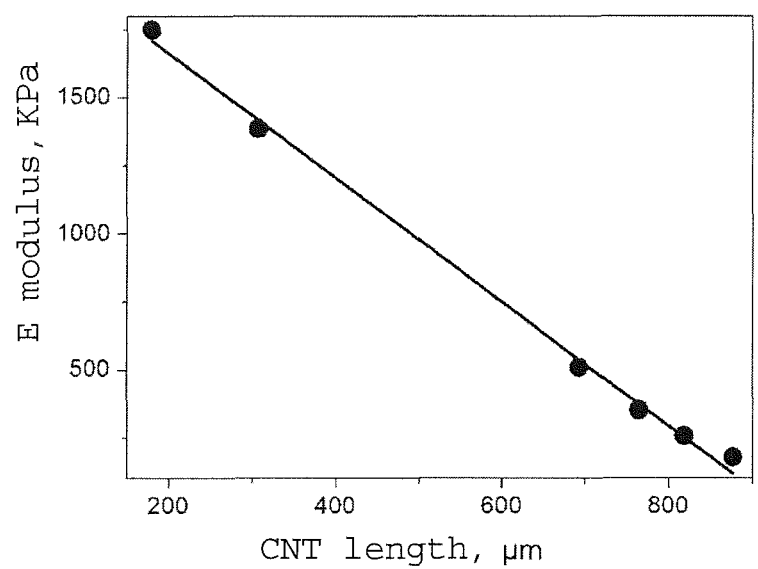

FIG. 7 shows the elastic modulus (in kPa) as a function of the height of the CNT block (in μm). This shows clearly that the stiffness can be controlled well by means of the height of the CNT blocks and drops sharply with an increase in the length of the CNT block.

REFERENCE NUMERALS

1 Spring sensor element
2 Carrier
3 Substrate
6 Carbon nanotubes
7 Intermediate layer
8 Intermediate block
10 Main block
20, 30, 40 Secondary block
50 Magnet
51 Magnetic field sensor
60, 61, 62 Electric contacts
100 Vertical force component
200 First horizontal force component
300 Second horizontal force component
αAlignment angle
H Height
B Width
T Depth

The invention claimed is:

1. A spring sensor element (1) comprising carbon nanotubes (6) on a carrier (2), wherein the carbon nanotubes (6) are arranged in carbon nanotube blocks, wherein the carbon nanotubes (6) of a first carbon nanotube block have a height H1, wherein at least the first carbon nanotube block is a highest one of the carbon nanotube blocks and is arranged near to at least two electric contacts (60, 61, 62), characterized in that the spring sensor element (1) has at least one additional neighboring and second carbon nanotube block having a height H2 in addition to the first carbon nanotube block (10) of the height H1, wherein the heights H1 and H2 differ by a factor of at least 2, wherein, in an absence of an applied force, the first set of carbon nanotubes are not in contact with the at least two electrical contacts, so that an electrical resistance between the contacts is high because there are no lateral transverse connections between the first set of carbon nanotubes and the second set of carbon nanotubes over which current can flow.

2. The spring sensor element (1) according to claim 1, characterized in that the first carbon nanotube block with the height H1 is situated between the neighboring second carbon nanotube block with the height H2 and a third carbon nanotube block with the height H3, wherein the first, second, and third carbon nanotube blocks are arranged in a single row, and the heights H1 and H2 as well as the heights H1 and H3 each differ by a factor of at least 2, wherein the first carbon nanotube block is the higher one.

3. The spring sensor element (1) according to claim 1, characterized in that the spring sensor element (1) additionally has fourth carbon nanotube block, wherein the first, second, third, and fourth carbon nanotube blocks are arranged in several rows for measuring a first force component (200) and a second force component (300).

4. The spring sensor element (1) according to claim 1, characterized in that the spring sensor element (1) has a substrate (3), which faces away from at least the first and second carbon nanotube blocks.

5. The spring sensor element (1) according to claim 4, characterized in that the substrate (3) is a flexible film.

6. The spring sensor element (1) according to claim 5, wherein the flexible film is a plastic.

7. The spring sensor element (1) according to claim 6, wherein the plastic is selected from the group consisting of polyethylene terephthalate (PET), polyvinyl chloride (PVC) and polyamide.

8. The spring sensor element (1) according to claim 1, characterized in that the spring sensor element (1) has an intermediate layer (7), which faces at least the first and second carbon nanotube blocks on the carrier (2).

9. The spring sensor element (1) according to claim 8, characterized in that the intermediate layer (7) has a thickness of less than 10 nm.

10. The spring sensor element (1) according to claim 1, characterized in that the spring sensor element (1) has an electrically conductive intermediate block (8) between at least the first and second carbon nanotube blocks.

11. The spring sensor element (1) according to claim 1, characterized in that the spring sensor element (1) comprises at least one magnet (50) on the side of at least one carbon nanotube block facing away from the carrier (2).

12. In a method of measuring at least one of a force component and an acceleration component using a spring sensor element, the improvement comprising using the spring sensor element (1) according to claim 1.

13. The spring sensor element (1) according to claim 1, wherein each carbon nanotube block has the same length and same alignment with respect to the carrier (2).

14. A spring sensor element (1) comprising carbon nanotubes (6) on a carrier (2), wherein the carbon nanotubes (6) are arranged in carbon nanotube blocks, wherein the carbon nanotubes (6) of a first carbon nanotube block have a height H1, wherein at least the first carbon nanotube block is a highest one of the carbon nanotube blocks and is arranged near to at least two electric contacts (60, 61, 62), characterized in that the spring sensor element (1) has at least one additional neighboring and second carbon nanotube block having a height H2 in addition to the first carbon nanotube block (10) of the height H1, wherein the heights H1 and H2 differ by a factor of at least 2,
wherein the first set of carbon nanotubes is near and between the at least two electric contacts so that in an absence of an applied force, there is no connection of the first set of carbon nanotubes with the at least two electric contacts on the carrier and the second set of carbon nanotubes, wherein in the absence of the applied force, an electrical resistance between the at least two electric contacts is high because there are no lateral transverse connections between the first set of carbon nanotubes and the second set of carbon nanotubes over which current can flow.

15. The spring sensor element (1) according to claim 14, characterized in that the first carbon nanotube block with the height H1 is situated between the neighboring second carbon nanotube block with the height H2 and a third carbon nanotube block with the height H3, wherein the first, second, and third carbon nanotube blocks are arranged in a single row, and the heights H1 and H2 as well as the heights H1 and H3 each differ by a factor of at least 2, wherein the first carbon nanotube block is the higher one.

16. The spring sensor element (1) according to claim 14, characterized in that the spring sensor element (1) additionally has fourth carbon nanotube block, wherein the first, second, third, and fourth carbon nanotube blocks are arranged in several rows for measuring a first force component (200) and a second force component (300).

17. The spring sensor element (1) according to claim 14, characterized in that the spring sensor element (1) has a substrate (3), which faces away from at least the first and second carbon nanotube blocks.

18. The spring sensor element (1) according to claim 17, characterized in that the substrate (3) is a flexible film.

19. The spring sensor element (1) according to claim 18, wherein the flexible film is a plastic.

20. The spring sensor element (1) according to claim 19, wherein the plastic is selected from the group consisting of polyethylene terephthalate (PET), polyvinyl chloride (PVC) and polyamide.

21. The spring sensor element (1) according to claim 14, characterized in that the spring sensor element (1) has an intermediate layer (7), which faces at least the first and second carbon nanotube blocks on the carrier (2).

22. The spring sensor element (1) according to claim 21, characterized in that the intermediate layer (7) has a thickness of less than 10 nm.

23. The spring sensor element (1) according to claim 14, characterized in that the spring sensor element (1) has an electrically conductive intermediate block (8) between at least the first and second carbon nanotube blocks.

24. The spring sensor element (1) according to claim 14, characterized in that the spring sensor element (1) comprises at least one magnet (50) on the side of at least one carbon nanotube block facing away from the carrier (2).

25. In a method of measuring at least one of a force component and an acceleration component using a spring sensor element, the improvement comprising using the spring sensor element (1) according to claim 14.

26. The spring sensor element (1) according to claim 14, wherein each carbon nanotube block has the same length and same alignment with respect to the carrier (2).

* * * * *